United States Patent
Chen et al.

(10) Patent No.: US 9,848,007 B2
(45) Date of Patent: Dec. 19, 2017

(54) ANOMALOUS EVENT DETECTION BASED ON METRICS PERTAINING TO A PRODUCTION SYSTEM

(71) Applicant: Microsoft Technology Licensing, LLC, Redmond, WA (US)

(72) Inventors: Jieying Chen, Sunnyvale, CA (US); Xiao Li, Mountain View, CA (US); Deepak Kumar, Mountain View, CA (US); Anmol Bhasin, Los Altos, CA (US); Bhaskaran Devaraj, Newark, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/501,664

(22) Filed: Sep. 30, 2014

(65) Prior Publication Data

US 2016/0065604 A1  Mar. 3, 2016

Related U.S. Application Data

(60) Provisional application No. 62/044,164, filed on Aug. 29, 2014.

(51) Int. Cl.
| | |
|---|---|
| H04L 29/06 | (2006.01) |
| G06Q 30/00 | (2012.01) |
| G06F 21/62 | (2013.01) |
| G06F 21/55 | (2013.01) |
| G06F 21/31 | (2013.01) |

(Continued)

(52) U.S. Cl.
CPC ........ *H04L 63/1425* (2013.01); *G06F 21/316* (2013.01); *G06F 21/552* (2013.01); *G06F 21/6227* (2013.01); *G06Q 30/0185* (2013.01); *H04L 63/1408* (2013.01); *G06F 2221/2101* (2013.01); *G06F 2221/2151* (2013.01); *G06Q 50/01* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 2007/0073579 A1* | 3/2007 | Immorlica | G06Q 30/0267 705/14.47 |
| 2012/0278477 A1* | 11/2012 | Terrell | H04L 41/5009 709/224 |
| 2015/0026027 A1* | 1/2015 | Priess | G06Q 40/00 705/35 |

* cited by examiner

*Primary Examiner* — Hadi Armouche
*Assistant Examiner* — Andrew Steinle
(74) *Attorney, Agent, or Firm* — Schwegman Lundberg & Woessner, P.A.

(57) ABSTRACT

A machine may be configured to detect an anomalous event based on metrics pertaining to a production system. For example, the machine analyzes a time series of values associated with a metric pertaining to a production system. The machine identifies a pattern associated with the time series based on the analysis of the time series. The pattern may describe an occurrence of particular values at particular timestamps of the time series. The machine determines a range of potential values for a next timestamp in the time series based on the pattern. The machine assigns a score value to an actual value associated with the metric and corresponding to the next timestamp. The assigning of the score value may be based on a comparison of the actual value and the range of potential values. The machine identifies the actual value as a candidate for an alert based on the score value.

18 Claims, 16 Drawing Sheets

(51) Int. Cl.
*H04L 29/08* (2006.01)
*G06Q 50/00* (2012.01)

| EVENT | GRAPH | TIME | SEVERITY | CAMPAIGN_TYPE | TYPE | CHANNEL ID | OS | FABRIC | ACTION |
|---|---|---|---|---|---|---|---|---|---|
| ▲GROUPID:1 (15 ALERTS) | | | | | | | | | |
| 1 | GRAPH | 5/9 05:20:00 | HIGH | 5 | IMPRESSION_PER_... | AGGREGATE | AGGREGATE | | ⇔ |
| 1 | GRAPH | 5/14 14:40:00 | HIGH | 14 | IMPRESSION_RATE | 2 | AGGREGATE | 1402 | ⇔ |
| 1 | GRAPH | 5/14 14:40:00 | HIGH | 14 | IMPRESSION_RATE | 2000 | AGGREGATE | | ⇔ |
| 1 | GRAPH | 5/13 5:20:00 | HIGH | 14 | ADS_RETURN_RATE | 3000 | ANDROID | | ⇔ |
| 1 | GRAPH | 5/13 5:20:00 | HIGH | 14 | ADS_RETURN_RATE | 2000 | AGGREGATE | | ⇔ |
| 1 | GRAPH | 5/13 5:20:00 | HIGH | 5 | IMPRESSION_RATE | AGGREGATE | AGGREGATE | | ⇔ |
| 1 | GRAPH | 5/13 5:20:00 | HIGH | 14 | ADS_RETURN_RATE | 3000 | AGGREGATE | 1404 | ⇔ |
| 1 | GRAPH | 5/13 5:20:00 | MEDIUM | 14 | ADS_RETURN_RATE | 3000 | IPHONE | | ⇔ |
| 1 | GRAPH | 5/13 5:40:00 | MEDIUM | 14 | ADS_RETURN_RATE | 3000 | ANDROID | | ⇔ |
| 1 | GRAPH | 5/13 5:40:00 | MEDIUM | 14 | ADS_RETURN_RATE | 3000 | AGGREGATE | | ⇔ |
| 1 | GRAPH | 5/13 5:40:00 | MEDIUM | 14 | CTR | 3000 | ANDROID | | ⇔ |
| 1 | GRAPH | 5/13 5:40:00 | MEDIUM | 14 | ADS_RETURN_RATE | 3000 | ANDROID | | ⇔ |
| 1 | GRAPH | 5/13 5:00:00 | MEDIUM | 14 | ADS_RETURN_RATE | 3000 | AGGREGATE | | ⇔ |
| 1 | GRAPH | 5/13 5:40:00 | MEDIUM | 14 | CTR | 3000 | AGGREGATE | | ⇔ |

FIG. 14

ANOMALOUS EVENT DETECTION BASED ON METRICS PERTAINING TO A PRODUCTION SYSTEM

CLAIM OF PRIORITY

This application claims the benefit of priority, under 35 U.S.C. §119(e), to U.S. Provisional Patent Application No. 62/044,164 by Chen et al., filed on Aug. 29, 2014, which is hereby incorporated herein by reference in its entirety.

TECHNICAL FIELD

The present application relates generally to the processing of data, and, in various example embodiments, to systems, methods, and computer program products for detecting an anomalous event based on metrics pertaining to a production system.

BACKGROUND

Traditionally, to detect anomalous events that relate to the performance of a production system, engineers manually analyze log files of various data pertaining to the production system. This method of anomaly detection may be very time-consuming and error-prone. Furthermore, this method of anomaly detection may not allow for a real-time analysis and response to the problem causing the anomalous event.

BRIEF DESCRIPTION OF THE DRAWINGS

Some embodiments are illustrated by way of example and not limitation in the figures of the accompanying drawings, in which:

FIG. 14 is a diagram that illustrates entries of anomalous events, according to some example embodiments;

DETAILED DESCRIPTION

Figure 1:
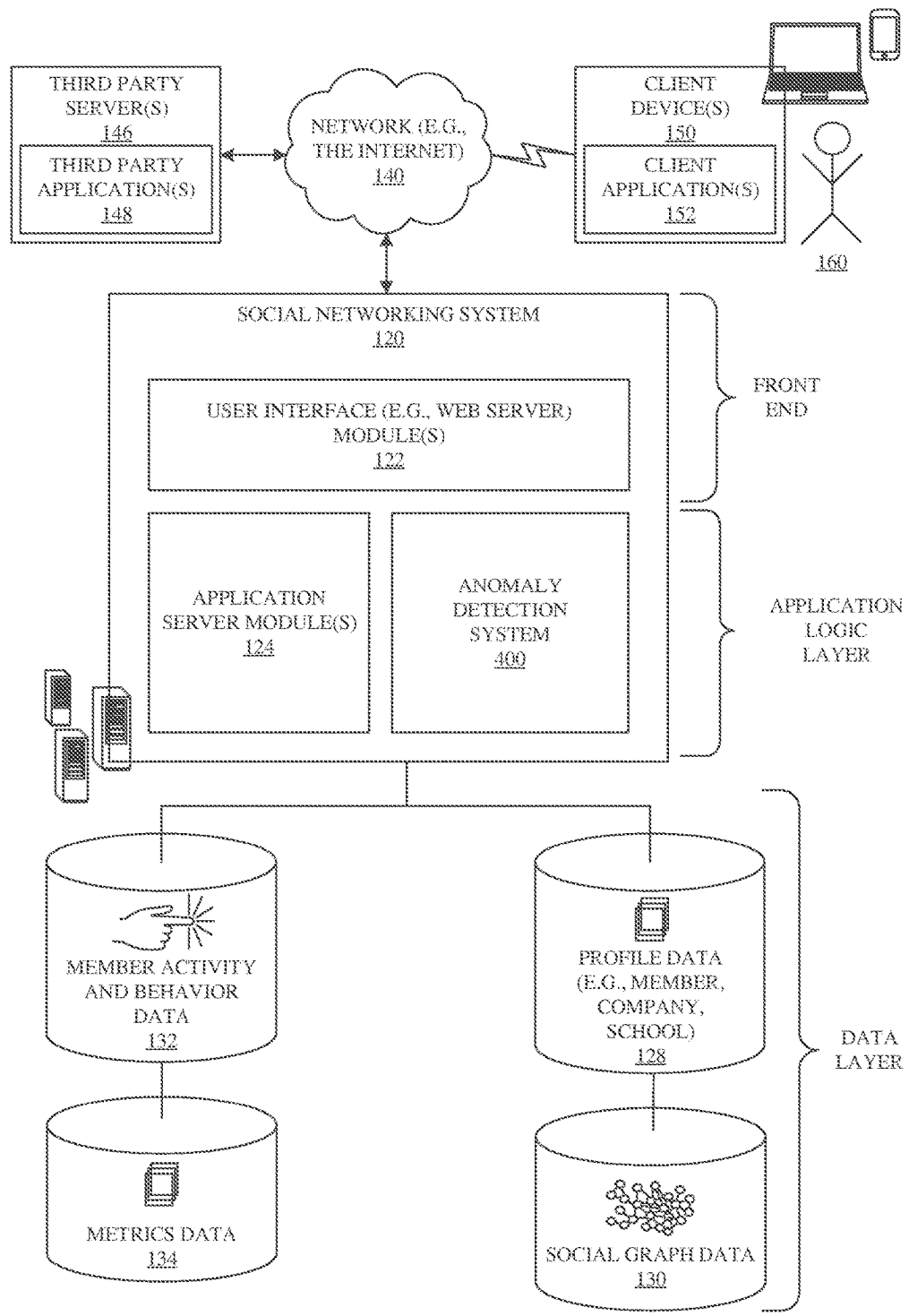
FIG. 1 is a network diagram illustrating a client-server system, according to some example embodiments.

Example methods and systems for detecting an anomalous event based on metrics pertaining to a production system are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

Various employees of a company that has an online presence may find it desirable to utilize a system that detects anomalous events related to the company's online business operation. An anomaly detection system may monitor various business metrics pertaining to a production system and may detect events considered abnormal based on a historical analysis of the various business metrics. The types of metrics that may be analyzed by the anomaly detection system are numerous. Some examples of such metrics are revenues (e.g., ads-related revenues), impression rates, click-through rates (CTRs) (e.g., online advertising CTRs or email CTRs), the number of new or old users visiting a website, the number of users signing for a particular service, etc. Information pertaining to a production system such as the number of times an ad was served or the number of click-throughs resulting from the showing of a particular ad during a period of time is important in providing various employees of the company with an understanding of whether certain business objectives are met or in identifying problems related to different aspect of the business.

According to some example embodiments, the anomaly detection system analyzes a time series of values associated with a metric pertaining to a production system. Each value in the time series may be associated with a timestamp in the time series indicating the time of measuring the value associated with the metric. The values may be ordered in the time series based on the timestamps associated with the values. For example, a plurality of values in a particular time series pertaining to the "revenues" metric indicate a plurality of revenue values ordered within the time series based on the times when each of the plurality of revenue values was measured.

In some example embodiments, the anomaly detection system generates a training data set of values associated with the metric. The training data set may be used by the anomaly detection system to determine whether the time series exhibits one or more patterns (e.g., trends or seasonalities) over time. For example, certain time series of values associated with a metric exhibit a seasonal pattern of user activity (e.g., high activity during work days and low activity on the weekends; low activity during the holidays; etc.). Alternatively or additionally, the training data set may be used by the anomaly detection system to predict a range of possible, non-anomalous values of the metric for a next timestamp of the time series. The identifying of seasonal variations, short- or long-term trends may facilitate the predicting of possible future values associated with particular future timestamps.

The anomaly detection system may continuously update the training data set to include the actual values measured at particular timestamps of the time series and to exclude actual values that are identified as indicating the occurrence of anomalous events. In some instances, the anomaly detection system determines that the training data does not include values indicating anomalous events. In such cases, the anomaly detection system may not remove any anomalous event data from the training data set. The iterative updating of the data included in the training data set may facilitate a more accurate identifying of patterns in time series and more accurate predictions of ranges of potential values associated with the metric.

The anomaly detection system may identify a pattern (e.g., a pattern of values of the metric) associated with the time series based on the analysis of the time series. The pattern may describe an occurrence of particular values at particular timestamps of the time series. A pattern may appear one or more times in a time series.

The anomaly detection system may determine a range of potential values for a next timestamp in the time series of values based on the pattern associated with the time series. For example, the anomaly detection system may perform an analysis of the historical data pertaining to a particular metric or a particular breakdown (e.g., attribute, category, class, level, etc.) associated with a metric. For each time point associated with the pattern, the anomaly detection system may identify one or more values in the time series that were measured at timestamps that correspond to a particular time point associated with the pattern. The one or more values associated with the particular time points in the pattern may be part of a training data set of values utilized for determining the range of potential values for a next timestamp in a particular time series. For each time series associated with a metric (e.g., a time series of the metric or a time series of a breakdown of the metric), the anomaly detection system may generate a particular training data set to facilitate the determining of the ranges of potential values for the next timestamps in a particular time series.

The anomaly detection system may also identify certain values of the metric or of the breakdown that indicate that, at certain previous timestamps in the time series, anomalous events took place. Such values that indicate anomalies may be excluded from the range of potential values for the next timestamp. Values that are not identified as indicating anomalous events may be included in the range of potential values for the next timestamp.

The anomaly detection system may assign a score value (e.g., an abnormality score value or an anomaly score value) to an actual value associated with the metric and corresponding to the next timestamp in the time series. The assigning of the score value may be based on a comparison of the actual value and the range of potential values.

The anomaly detection system may, in some instances, identify the actual value as a candidate for an alert based on the score value assigned to the actual value. The identifying of the actual value as a candidate for an alert may include determining that the score value assigned to the actual value associated with the metric and corresponding to the timestamp indicates an occurrence of an anomalous event at the time indicated by the timestamp. Consistent with certain example embodiments, the anomaly detection system ranks a plurality of time series that include values identified as candidates for alerts and triggers alerts for a top number (or percentage) of the ranked time series.

In some example embodiments, the anomaly detection system identifies a severity level of the anomalous event based on the score value and triggers an alert pertaining to the anomalous event based on a particular (e.g., heightened) severity level of the anomalous event. The alert may reference the metric, an entry that identifies the anomalous event, the actual value, or a suitable combination thereof. The alert may also indicate the severity level of the anomalous event.

According to various example embodiments, the anomaly detection system communicates the alerts to a device associated with a user (e.g., an engineer, a manager, etc.). The alert, in some instances, is displayed in a user interface (UI). In some example embodiments, the alert is displayed as a graph of a time series including the value indicating an anomalous event. In certain example embodiments, a plurality of time series are grouped based on one or more attributes (e.g., mobile, operating system, time, etc.) of the metrics. The group of time series may be displayed to the user in such a way as to assist the user to quickly identify the anomalous event affecting the operation of the business.

For example, the anomaly detection system may determine that, for the CTR metric, the time series pertaining to the breakdowns "Company XYZ Ads," "US," "mobile," and "iPhone" include values identified as candidates for alerts. The anomaly detection system may group the "Company XYZ Ads" time series, the "US" time series, the "mobile" time series, and the "iPhone" time series into a group of time series that together indicate the type of problem (e.g., anomalous event) affecting the CTR metric. The anomaly detection system may cause the display of a group of identifiers that identify (e.g., correspond to) the time series included in the group of time series to an engineer. The group presentation of the time series may allow the engineer to quickly determine that iPhone users in the US may have problems selecting to view (e.g., clicking on) ads by Company XYZ. The "mobile" breakdown may indicate that the problem is limited to mobile users, and that the users of tablets or desktops may not be affected by the anomalous event.

One example advantage of the anomaly detection system is its scalability. The anomaly detection system may analyze a large number of time series simultaneously. The anomaly detection system may be configured to analyze new metrics as well as new breakdowns associated with the metrics. Another example advantage of the anomaly detection system is the ability to issue real-time alerts based on identifying anomalous events pertaining to the production system.

The anomaly detection system may also remove data indicating the occurrence of anomalous events from the training data set. Alternatively, the anomaly detection system may not remove anomalous values from the training data set based on determining that the training data set does not include any anomalous values. Additionally, the anomaly detection system may determine that certain values are missing in a time series and may adjust the processes of collecting of the training data, of identifying the pattern associated with the time series, and of determining the ranges of potential values to account for a missing value for a particular timestamp. The determining of whether to extract anomalous values from the training data set, the extraction of the anomalous values, and the handling of the missing data may make the anomaly detection system very robust in the production environment and may eliminate the need for a feedback loop from a human or algorithmic evaluation of the training data set. Furthermore, these functionalities of the anomaly detection system may facilitate an accurate identification by the anomaly detection system of the normal trends associated with a metrics pertaining to the operation of the business, the avoidance of triggering alerts for normal values of the metric, and the missing of the occurrence of anomalous events.

The time series for certain metrics, such as revenue or clicks, may exhibit good periodicity (e.g., show daily or weekly patterns). The anomaly detection system may be configured to perform its functions regardless of whether the times series being analyzed are characterized by good periodicity or not. Furthermore, the anomaly detection system may generate time series of values not only for a particular metric, but also for the breakdowns (e.g., categories, attributes, dimensions, etc.) of the particular metric. For example, in addition to generating a time series for the number of click-throughs (also "clicks") metric that indicates the total number an ad was selected for viewing, the anomaly detection system may generate time series based on a geographic region (e.g., the number of clicks from the US, the number of clicks from North America, etc.), a device platform (e.g., the number of clicks from desktops, the number of clicks from tablets, the number of clicks from mobile phones, etc.), a data center, an ad campaign type, mobile device operating system (e.g., iPhone or Android), etc. Accordingly, the data pertaining to a metric may be "sliced and diced" based on a plurality of breakdowns associated with the metric in order to obtain detailed information about an anomalous event.

The anomaly detection system may also support configuration changes. A user of the anomaly detection system (e.g., an engineer) may specify a new metric or breakdown of a metric to be monitored and analyzed, and may disable the monitoring of a metric or breakdown of a metric (e.g., the traffic switch between data centers).

An example method and system for detecting an anomalous event based on metrics pertaining to a production system may be implemented in the context of the client-server system illustrated in FIG. 1. As illustrated in FIG. 1, the anomaly detection system 400 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™ Windows® Phone).

For example, client device(s) 150 may be executing client application(s) 152. The client application(s) 152 may provide functionality to present information to a user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social network service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, items of content, and user interfaces of the social networking system 120, information relating to the member's activity and behavior (e.g., data pertaining to the member selecting or clicking on an online ad) may be stored in a database, such as database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of database 130.

In some example embodiments, the social networking system 120 may generate metrics for various types of data that pertain to the operation of one or more entities (e.g., businesses, companies, organizations, etc.). In some instances, the social networking system 120 may generate metrics based on the functionalities of the applications and services provided by the social networking system 120. The metrics data may be stored in a database, such as database 134. In some example embodiments, in addition to storing metrics, the database 134 stores training data sets used to identify patterns associated with time series of values of metrics and to determine ranges of potential values for future timestamps in the time series of values.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include the anomaly detection system 400, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
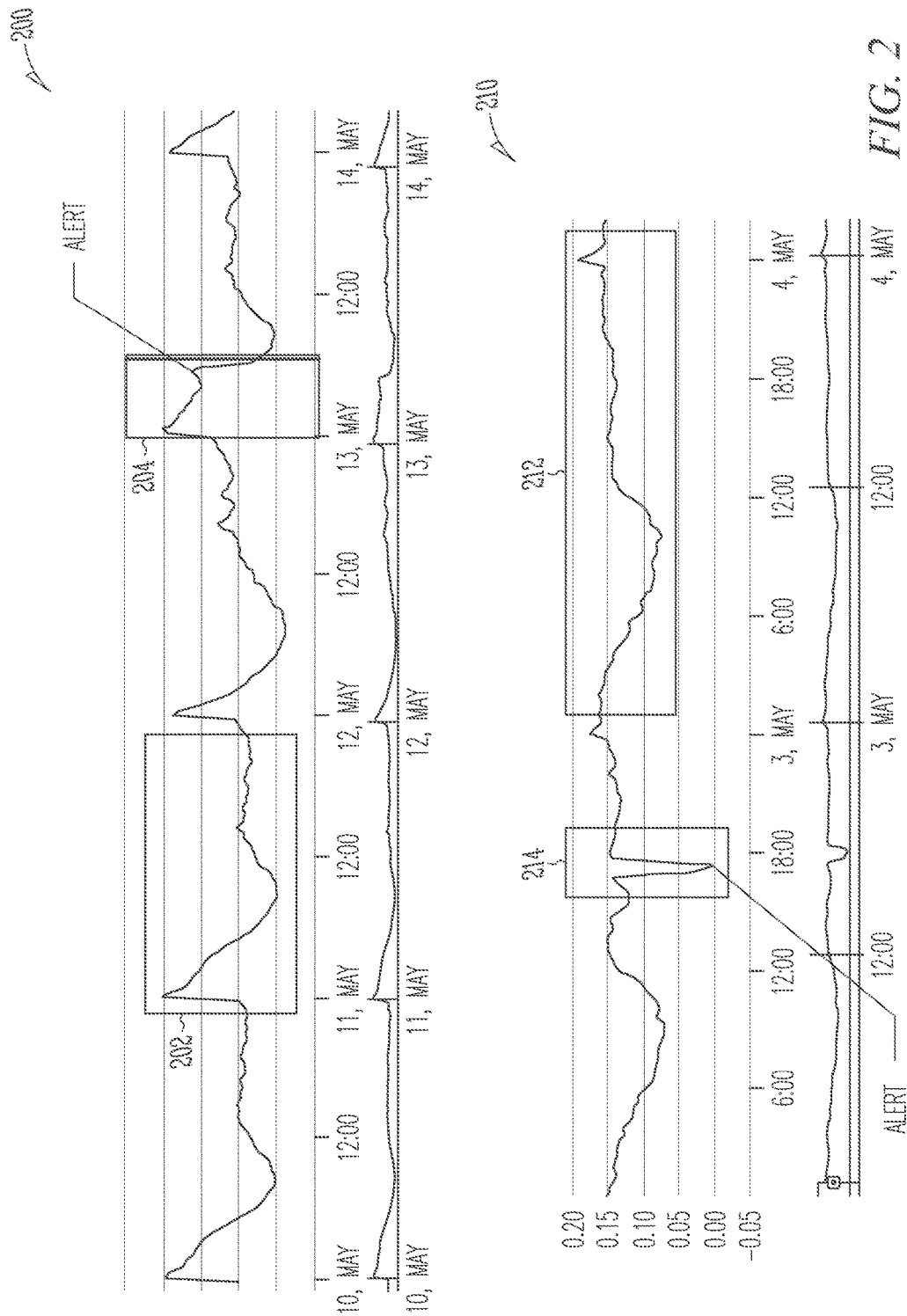
FIG. 2 is a diagram that illustrates graphs depicting time series of values associated with one or more metrics pertaining to a production system, according to some example embodiments.

FIG. 2 is a diagram that illustrates graphs depicting time series of values associated with one or more metrics pertaining to a production system, according to some example embodiments. As shown in FIG. 2, graph 200 represents a time series of values of a first metric monitored by the anomaly detection system 400. Graph 210 represents a time series of values of a second metric monitored by the anomaly detection system 400. Examples of metrics that may be monitored by the anomaly detection system 400 are clicks, impressions, cost, impression rate, first position impression rate, ads return rate, CTR, etc.

Some time series may have good periodicity by exhibiting repeating patterns of values registered at distinct periods of time. The pattern may describe the occurrence of a series of values of the metric at particular timestamps of the time series. For example, item 202 identifies a segment of graph 200 that illustrates a pattern of values present in the time series represented by the graph 200. Because the pattern identified by the item 202 appears several times in the time series represented by the graph 200, the time series represented by the graph 200 may be considered to have good periodicity. Similarly, item 212 identifies a segment of graph 210 that illustrates a pattern of values present in the time series represented by the graph 210.

The anomaly detection system 400 may automatically identify trends (e.g., one or more patterns) associated with the time series based on the analysis of the time series. The anomaly detection system 400 may also determine the duration of the seasonalities (e.g., seven days, one month, etc.) based on the analysis of the time series. Based on the identified trends, the anomaly detection system 400 may identify the occurrence of anomalous events (e.g., events outside the identified trends). As shown in FIG. 2, item 204 indicates a particular (e.g., an abnormal) value of the metric represented in the graph 200 that is different from one or more values in a segment of the pattern associated with a time in the pattern that corresponds to the timestamp of the particular value of the metric.

In some example embodiments, the anomaly detection system 400 identifies that the particular value is an abnormal value (e.g., indicates an anomalous event) based on identifying the duration of the pattern in the time series and comparing the particular value with the value of the metric measured at a previous time that corresponds to the duration of the pattern as measured from the timestamp of the particular value. In certain example embodiments, the anomaly detection system 400 determines a predicted value for a next timestamp and a confidence value associated with the predicted value (e.g., a probability that the predicted value may occur) based on the identified patterns of values in the time series of the metric. The anomaly detection system 400 may determine that an actual value measured at the next timestamp indicates an anomalous event based on a comparison of the actual value and the predicted value and the confidence value.

The values that are determined to be abnormal may be identified as candidates for alerts by the anomaly detection system 400. As shown in FIG. 2, the item 204 shows a first abnormal value in the time series represented by the graph 200 that is identified as a first candidate for an alert. Similarly, the item 214 shows a second abnormal value in the time series represented by the graph 210 that is identified as a second candidate for an alert. In some example embodiments, the anomaly detection system 400 determines the severity of a particular anomalous event before it triggers an alert based on the particular anomalous event.

Figure 3:
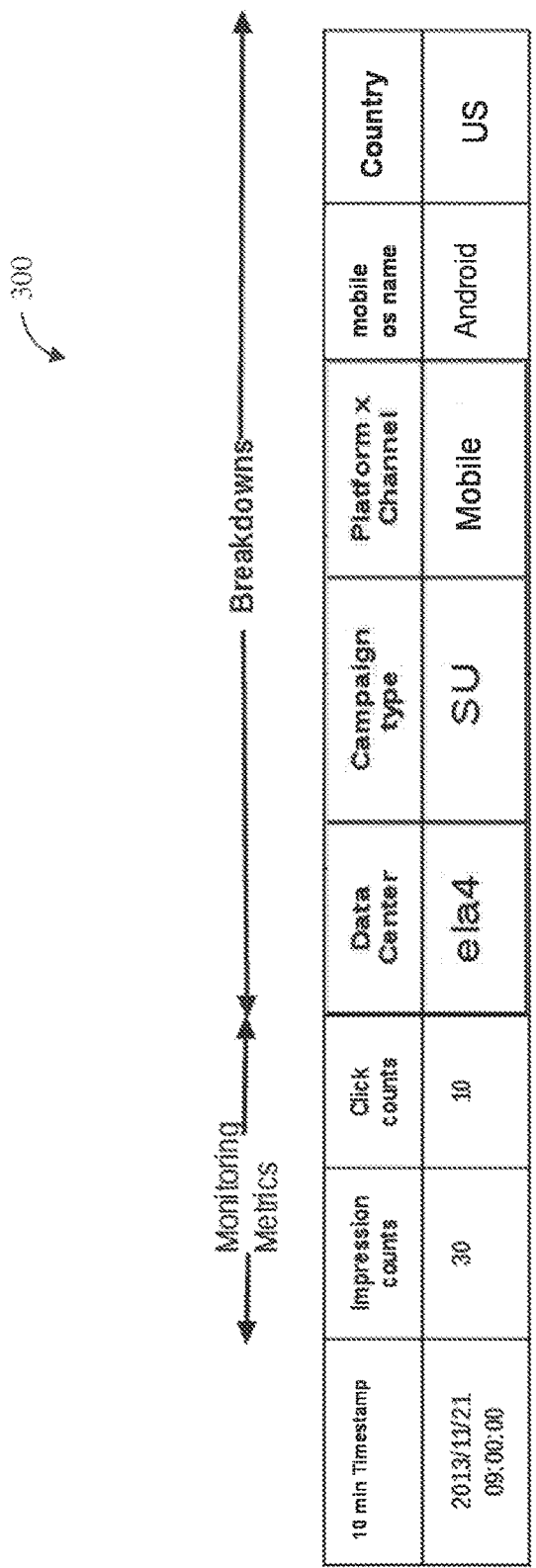
FIG. 3 is a diagram that illustrates metrics and breakdowns associated with the metrics, according to some example embodiments.

FIG. 3 is a diagram 300 that illustrates metrics and breakdowns associated with the metrics, according to some example embodiments. The anomaly detection system 400 may monitor a variety of metrics. Examples of such metrics are impression counts and click counts, as shown in FIG. 3. In some instances, the monitoring of a metric includes determining (e.g., measuring, identifying, computing, etc.), for one or more timestamps in a series of timestamps, a value of the metric that is associated with a particular timestamp. The values of the metric may be ordered in a time series, each of the values of the metric corresponding to a particular timestamp in the time series. For example, as shown in FIG. 3, a time series may include values of a metric that are determined every ten minutes.

The anomaly detection system 400 may generate time series for metrics and for breakdown associated with the metrics. Some examples of breakdown associated with the metrics are "data center," "campaign type," "platform," "mobile OS name," and "country," as shown in FIG. 3. By monitoring all possible combinations of breakdowns of a metric, the anomaly detection system 400 may perform a more detailed analysis of the data pertaining to the metrics. In some instances, by presenting analysis results according to the breakdowns of a metric to a user, the anomaly detection system 400 may facilitate a faster and a more accurate identification of the cause of a particular anomalous event.

Figure 4:
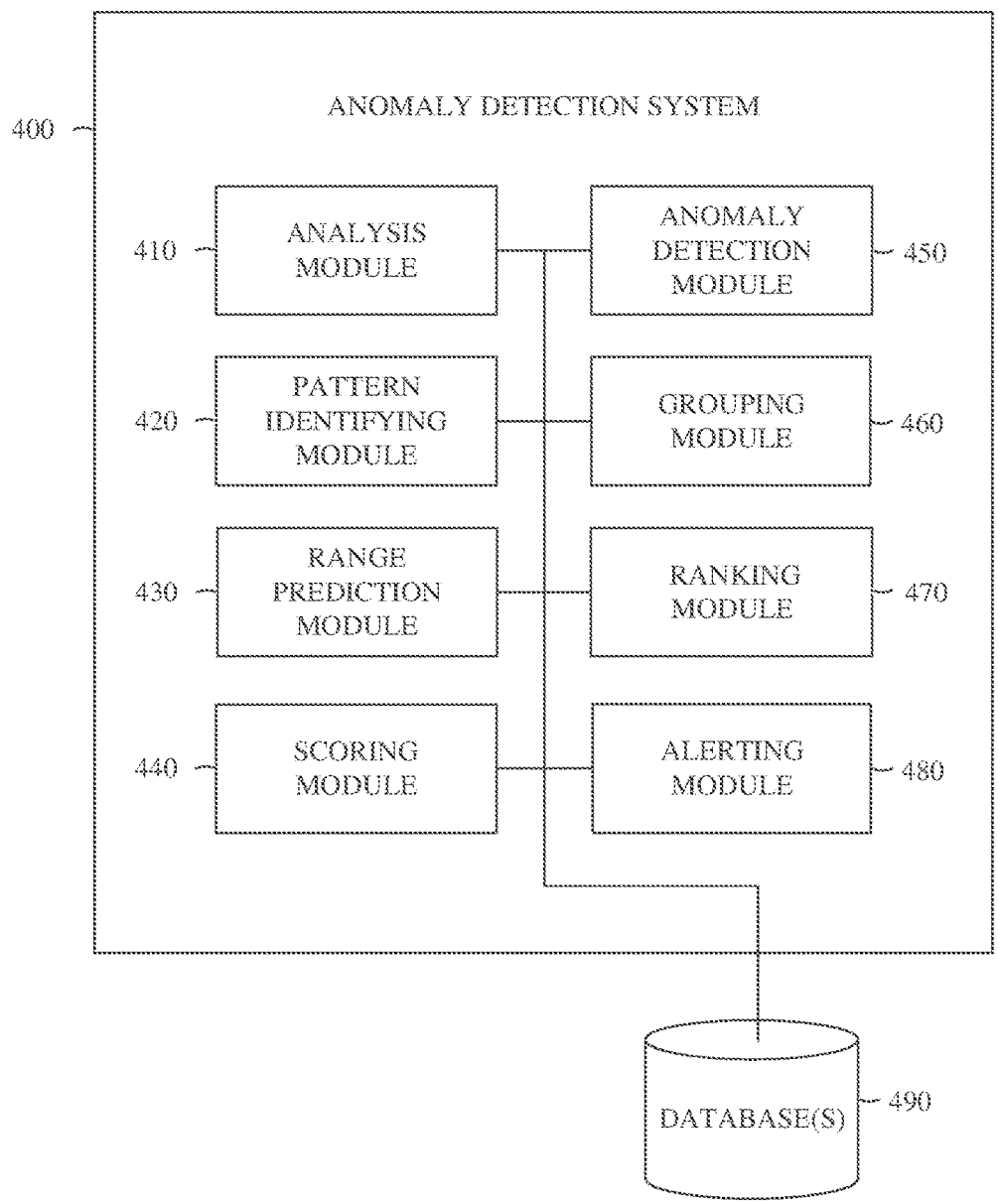
FIG. 4 is a block diagram illustrating components of an anomaly detection system, according to some example embodiments.

FIG. 4 is a block diagram illustrating components of the anomaly detection system 400, according to some example embodiments. As shown in FIG. 4, the anomaly detection system 400 may include an analysis module 410, a pattern identifying module 420, a range prediction module 430, a scoring module 440, an anomaly detection module 450, a grouping module 460, a ranking module 470, and an alerting module 480, all configured to communicate with each other (e.g., via a bus, shared memory, or a switch).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 490 (e.g., the database 128, the database 130, the database 132, or the database 134).

Figure 5:
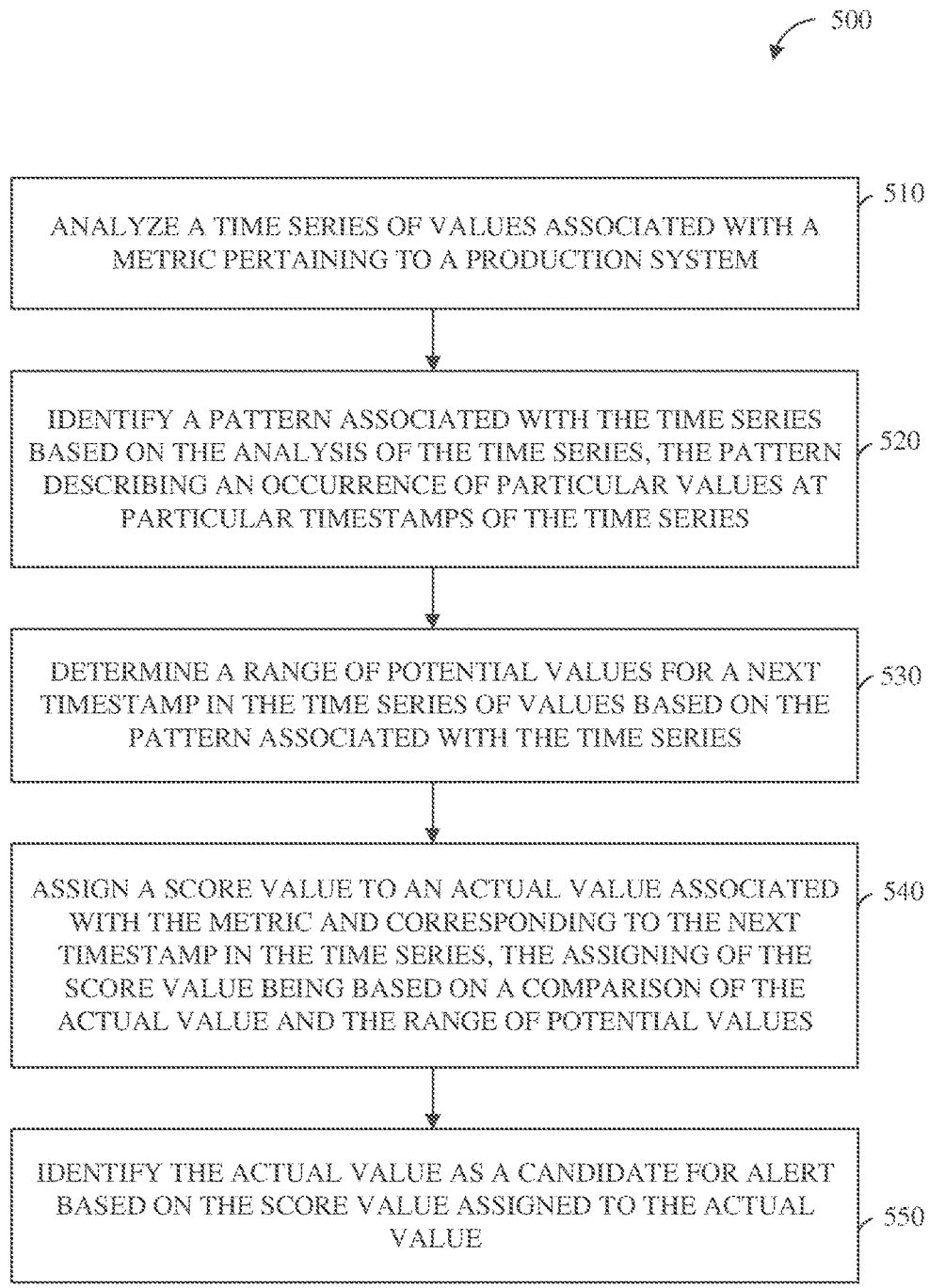
FIG. 5 is a flowchart illustrating a method of detecting an anomalous event based on metrics pertaining to a production system, according to some example embodiments.

FIGS. 5-12 and 14 are flowcharts illustrating a method of detecting an anomalous event based on metrics pertaining to a production system, according to some example embodiments. Operations in the method 500 may be performed using modules described above with respect to FIG. 4. As shown in FIG. 5, the method 500 may include one or more of operations 510, 520, 530, 540, and 550.

At method operation 510, the analysis module 410 analyzes a time series of values associated with a metric pertaining to a production system. The values in the time series may be ordered based on times of measuring the values.

At method operation 520, the pattern identifying module 420 identifies a pattern (e.g., a pattern of values) associated with the time series based on the analysis of the time series. The pattern may describe an occurrence of particular values at particular timestamps of the time series. In some example embodiments, the pattern is determined based on the data included in a training data set associated with the time series.

At method operation 530, the range prediction module 430 determines a range of potential values for a next timestamp in the time series of values. The determining of the range of potential values for the next timestamp may be based on the pattern associated with the time series. The range of potential values (also "confidence interval") for the next timestamp may include an upper confidence value and a lower confidence value. The upper confidence value may indicate the maximum value that may be considered normal for the next timestamp based on the pattern associated with the time series. The lower confidence value may indicate the minimum value that may be considered normal for the next timestamp based on the pattern associated with the time series. In some example embodiments, the range of potential values is determined based on the data included in a training data set associated with the time series.

At method operation 540, the scoring module 440 assigns a score value (e.g., an abnormality score value) to an actual value associated with the metric and corresponding to the next timestamp in the time series. The assigning of the score value to the actual value may be based on a comparison of the actual value and the range of potential values.

In some example embodiments, the score value may be normalized between 0 and 1. The normalizing of the score value may facilitate a comparison of anomalous events across different time series. If the actual value falls within the range of potential values, then the score value assigned to the actual value is high (e.g., close to 1) and the actual value may be considered normal or safe. If there is a large deviation between the actual value and the range of potential values, then the score value assigned to the actual value is low (e.g., close to 0) and the actual value may be considered abnormal.

At method operation 550, the anomaly detection module 450 identifies (e.g., flags, marks, etc.) the actual value as a candidate for an alert based on the score value assigned to the actual value. For example, the anomaly detection module 450 determines that the score value for the actual value is 0.2. The anomaly detection system 400, in some example embodiments, determines, based on an alert rule, that 0.2 is a low score value. Based on determining that the actual value is associated with a low score value, the anomaly detection system 400 may determine that the actual value is an abnormal value in the time series of values associated with the metric. The anomaly detection system 400 may trigger an alert. The alert may reference the metric including the actual value.

In certain example embodiments, the anomaly detection system 400 ranks a plurality of time series based on the score values assigned to a plurality of actual values corresponding to the most recent timestamps of the plurality of the time series. The anomaly detection system 400 may select the time series that have actual values with the lowest score values as candidates for alerts (e.g., all time series that have actual values associated with score values between 0.0 and 0.2). Alternately, the anomaly detection system 400 may select the time series that have actual values associated with score values that are below a particular threshold value as candidates for alerts.

Further details with respect to the method operations of the method 500 are described below with respect to FIGS. 6-12 and 14.

Figure 6:
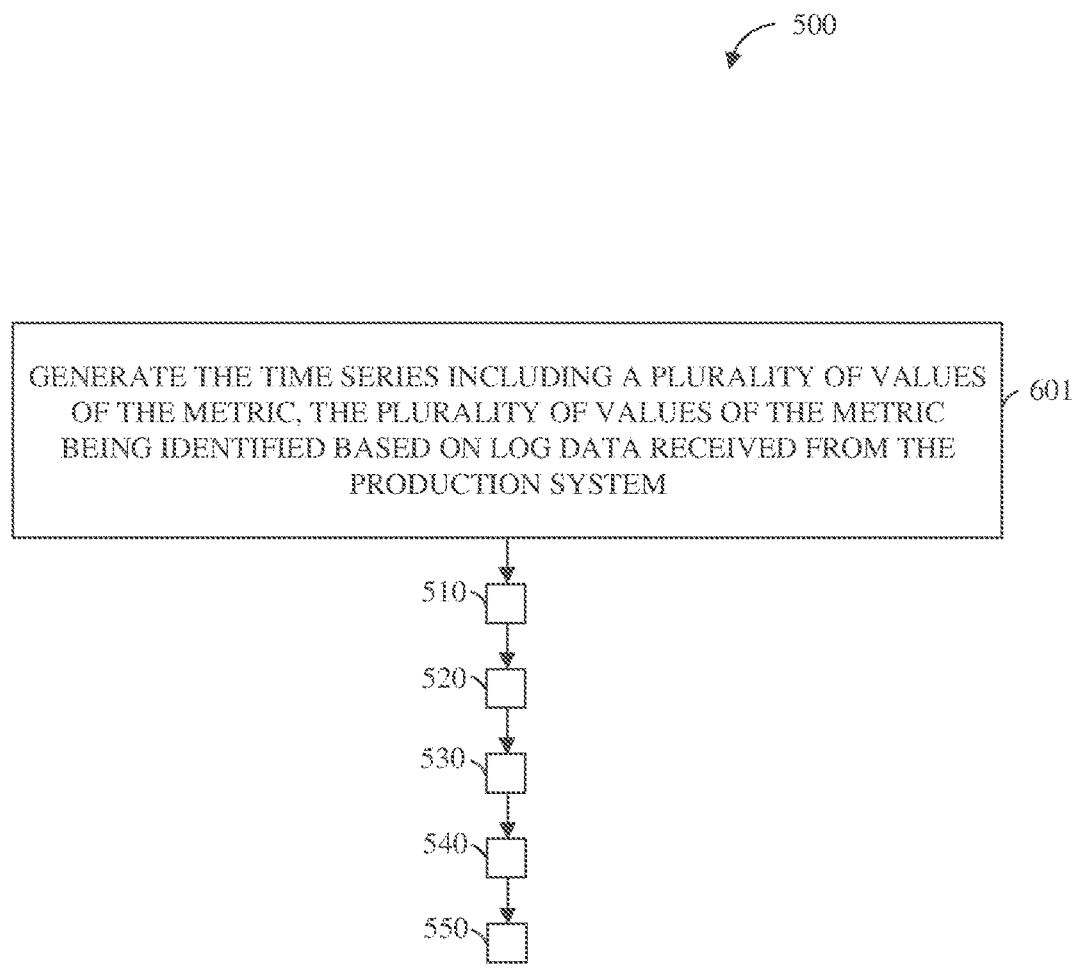
FIG. 6 is a flowchart that illustrates a method of detecting an anomalous event based on metrics pertaining to a production system and represents an additional step of the method illustrated in FIG. 5, according to some example embodiments.

As shown in FIG. 6, the method 500 may include method operation 601, according to some example embodiments. Method operation 601 may be performed before method operation 510, in which the analysis module 410 analyzes a time series of values associated with a metric pertaining to a production system.

At method operation 601, the analysis module 410 generates the time series including a plurality of values of the metric. The plurality of values of the metric may be identified based on log data received from the production system.

Figure 7:
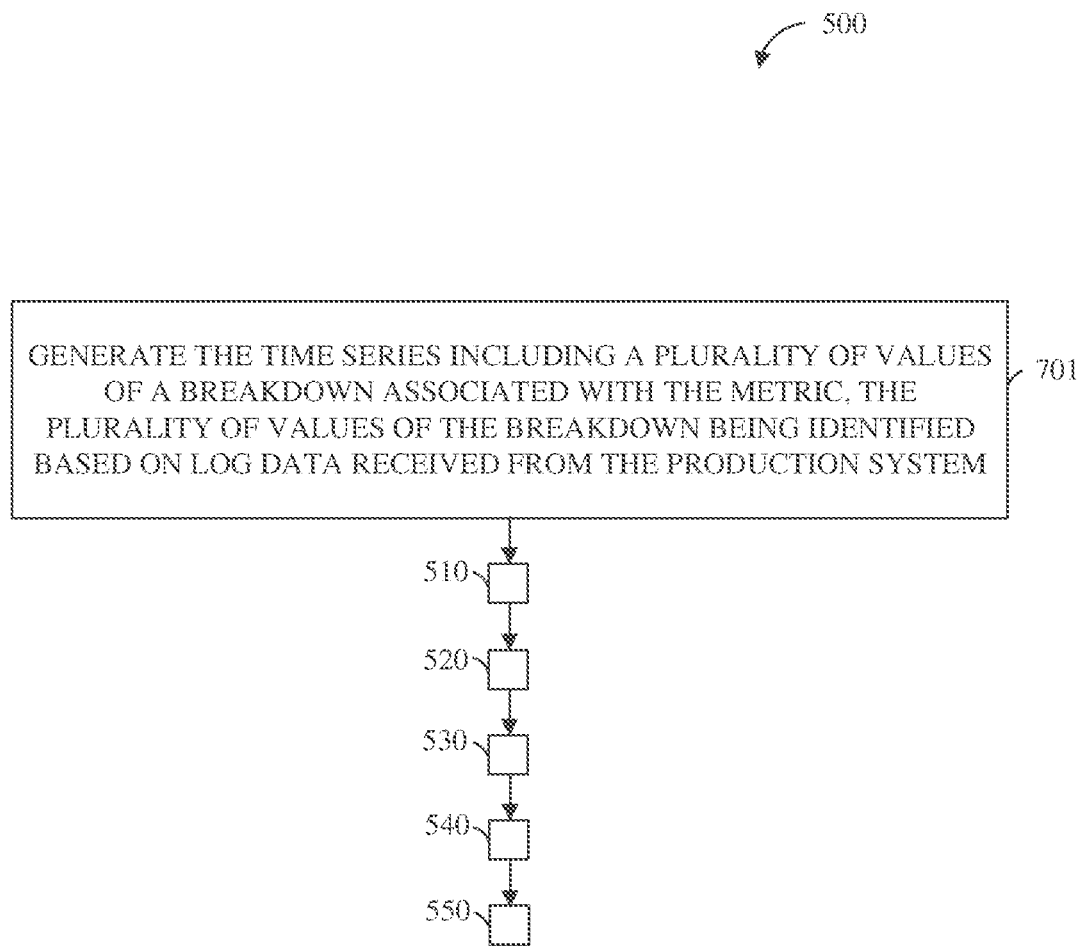
FIG. 7 is a flowchart that illustrates a method of detecting an anomalous event based on metrics pertaining to a production system and represents an additional step of the method illustrated in FIG. 5, according to some example embodiments.

As shown in FIG. 7, the method 500 may include method operation 701, according to some example embodiments. Method operation 701 may be performed before method operation 510, in which the analysis module 410 analyzes a time series of values associated with a metric pertaining to a production system.

At method operation 701, the analysis module 410 generates the time series including a plurality of values of a breakdown associated with the metric. The plurality of values of the breakdown may be identified based on log data received from the production system.

Figure 8:
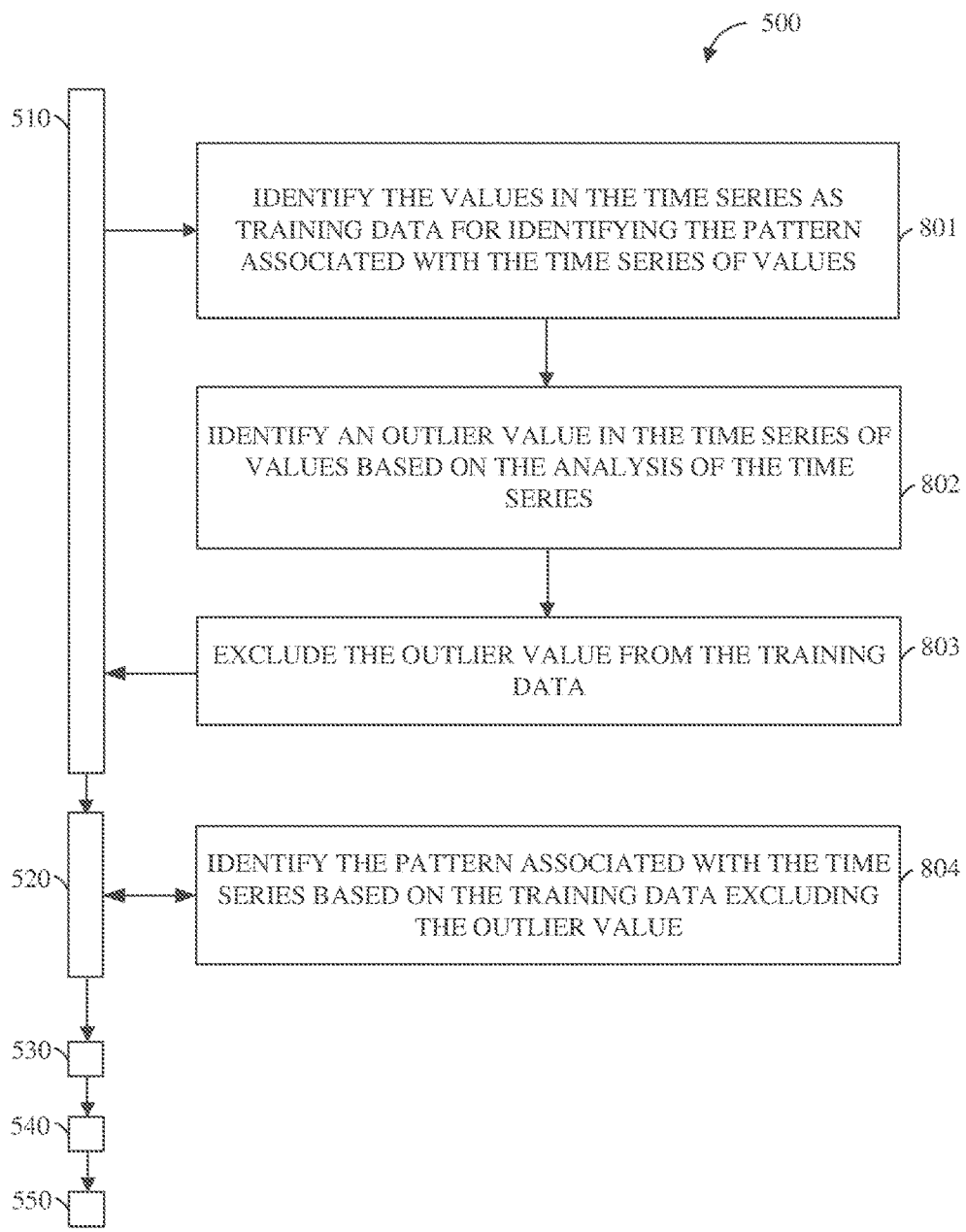
FIG. 8 is a flowchart that illustrates a method of detecting an anomalous event based on metrics pertaining to a production system and represents the steps 510 and 520 of FIG. 5 in more detail, according to some example embodiments.

As shown in FIG. 8, the method 500 may include method operations 801, 802, 803, and 804, according to some example embodiments. Method operation 801 may be performed as part (e.g., a precursor task, a subroutine, or a portion) of method operation 510, in which the analysis module 410 analyzes a time series of values associated with a metric pertaining to a production system. At method operation 801, the analysis module 410 identifies the values in the time series as training data for identifying the pattern associated with the time series of values.

Method operation 802 may be performed as part (e.g., a precursor task, a subroutine, or a portion) of method operation 510, after method operation 801. At method operation 802, the analysis module 410 identifies an outlier value in the time series of values based on the analysis of the time series. For example, the analysis module 410 may determine that, historically, for 90% of the timestamps of a time series, the values of the metric fall between 10 and 30. A value that is outside this range may be identified as an outlier value. In some example embodiments, the outlier value corresponds to a previous candidate for an alert.

Method operation 803 may be performed as part (e.g., a precursor task, a subroutine, or a portion) of method operation 510, after method operation 802. At method operation 803, the analysis module 410 excludes the outlier value from the training data.

Method operation 804 may be performed as part (e.g., a precursor task, a subroutine, or a portion) of method operation 520, in which the pattern identifying module 420 identifies a pattern associated with the time series based on the analysis of the time series. At method operation 804, the pattern identifying module 420 identifies the pattern associated with the time series based on the training data excluding the outlier value.

Figure 9:
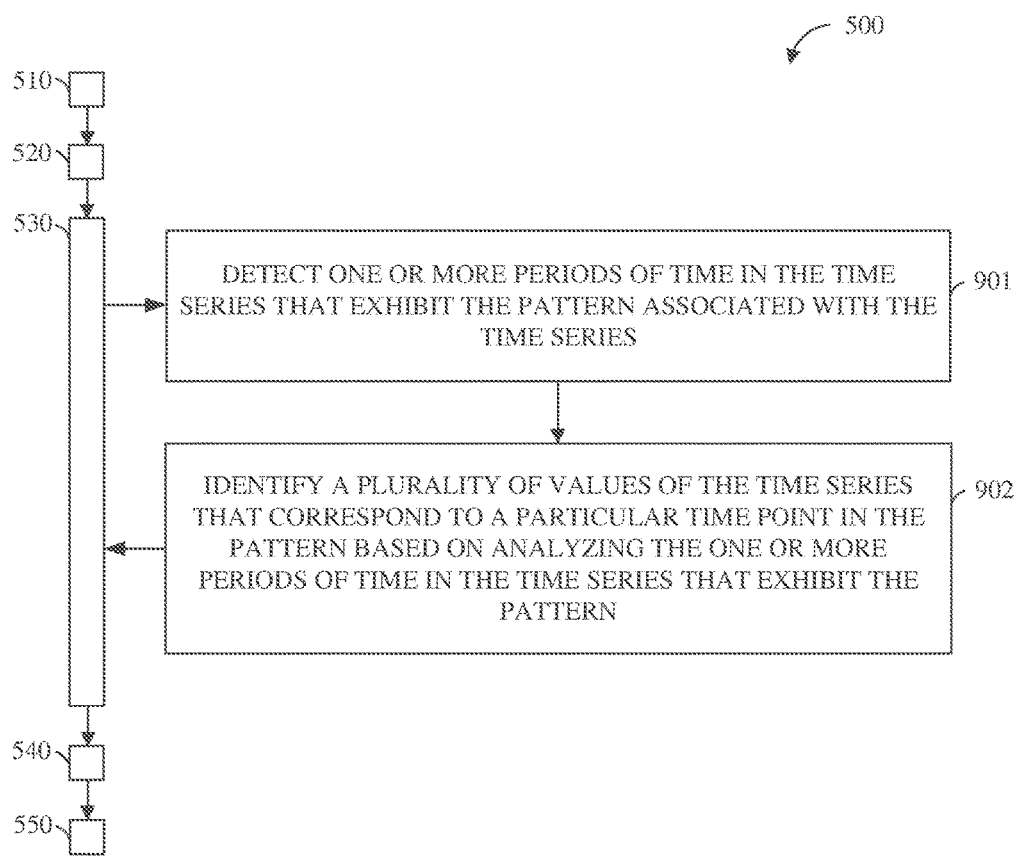
FIG. 9 is a flowchart that illustrates a method of detecting an anomalous event based on metrics pertaining to a production system and represents the step 530 of FIG. 5 in more detail, according to some example embodiments.

As shown in FIG. 9, the method 500 may include one or more method operations 901 and 902, according to some example embodiments. Method operation 901 may be performed as part (e.g., a precursor task, a subroutine, or a portion) of method operation 530, in which the range prediction module 430 determines a range of potential values for a next timestamp in the time series of values. At method operation 901, the range prediction module 430 detects one or more periods of time in the time series that exhibit the pattern associated with the time series.

Method operation 902 may be performed as part (e.g., a precursor task, a subroutine, or a portion) of method operation 530, after method operation 901. At method operation 902, the range prediction module 430 identifies a plurality of values of the time series that correspond to a particular time point in the pattern based on analyzing the one or more periods of time in the time series that exhibit the pattern.

Figure 10:
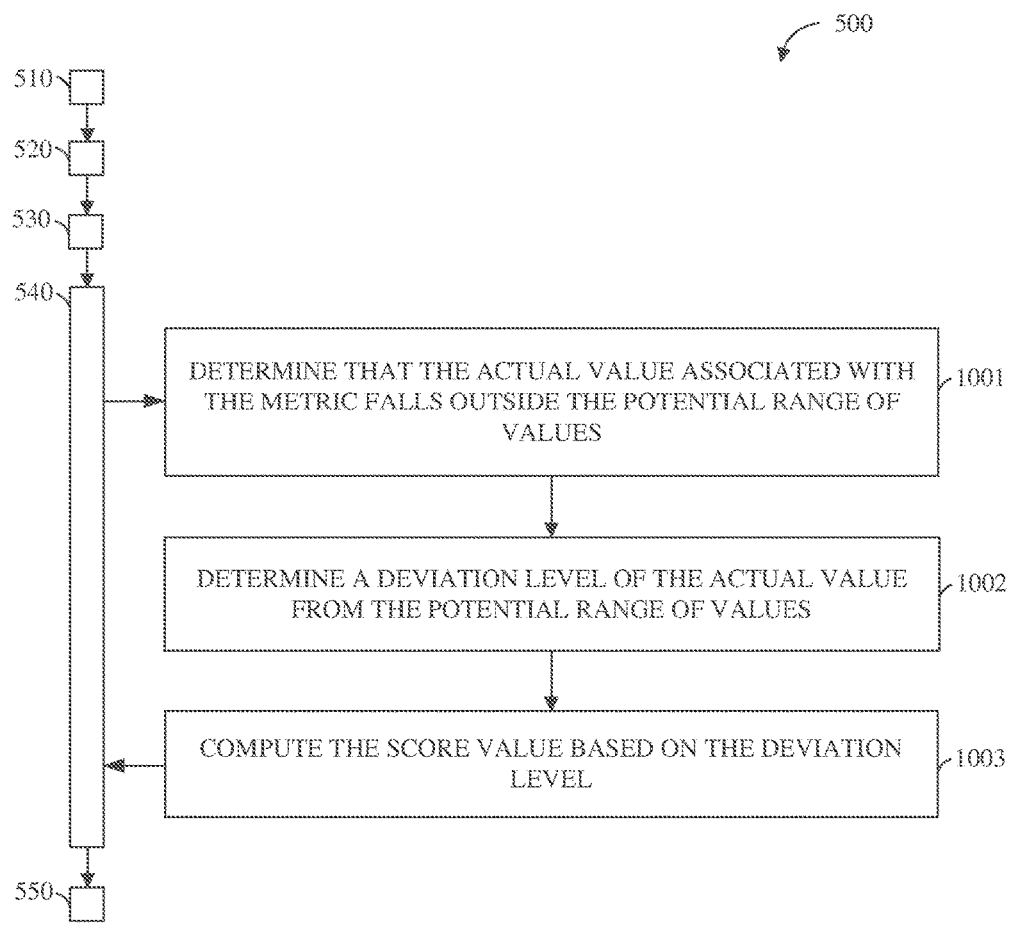
FIG. 10 is a flowchart that illustrates a method of detecting an anomalous event based on metrics pertaining to a production system and represents the step 540 of FIG. 5 in more detail, according to some example embodiments.

As shown in FIG. 10, the method 500 may include one or more method operations 1001, 1002, and 1003, according to some example embodiments. Method operation 1001 may be performed as part (e.g., a precursor task, a subroutine, or a portion) of method operation 540, in which the scoring module 440 assigns a score value (e.g., an abnormality score value) to an actual value associated with the metric and corresponding to the next timestamp in the time series. The actual value associated with the metric may be an actual value of the metric or an actual value of a breakdown of the metric. At method operation 1001, the scoring module 440 determines that the actual value associated with the metric falls outside the range of potential values. In some instances, the scoring module 440 may determine that the actual value associated with the metric falls outside the range of potential values by comparing the actual value and one or more values included in the range of potential values for the next timestamp in the time series.

Method operation 1002 may be performed as part (e.g., a precursor task, a subroutine, or a portion) of method operation 540, after method operation 1001. At method operation 1002, the scoring module 440 determines a deviation level of the actual value from the range of potential values (e.g., from an upper confidence value or from a lower confidence value). A measure of the deviation of the actual value from the range of potential values may indicate the severity of the anomalous event.

Method operation 1003 may be performed as part (e.g., a precursor task, a subroutine, or a portion) of method operation 540, after method operation 1002. At method operation 1003, the scoring module 440 computes the score value based on the deviation level.

Figure 11:
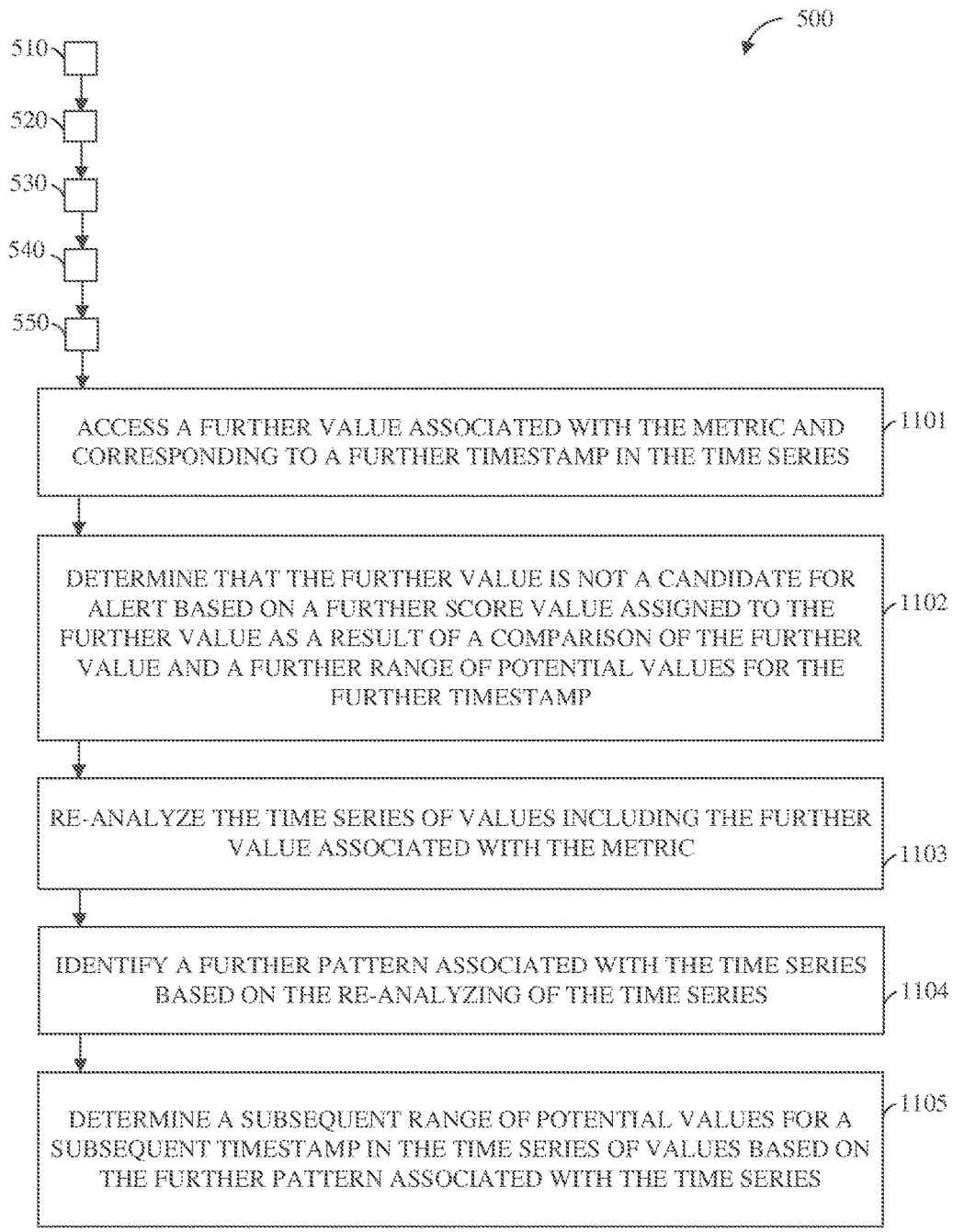
FIG. 11 is a flowchart that illustrates a method of detecting an anomalous event based on metrics pertaining to a production system and represents one or more additional steps of FIG. 5, according to some example embodiments.

As shown in FIG. 11, the method 500 may include one or more method operations 1101, 1102, 1103, 1104, and 1105, according to some example embodiments. Method operation 1101 may be performed after method operation 550, in which the anomaly detection module 450 identifies the actual value as a candidate for an alert based on the score value assigned to the actual value. At method operation 1101, the anomaly detection module 450 accesses a further value associated with the metric and corresponding to a further timestamp in the time series.

Method operation 1102 may be performed after method operation 1101. At method operation 1102, the anomaly detection module 450 determines that the further value is not a candidate for an alert based on a further score value (e.g., a further abnormality score value) assigned to the further value as a result of a comparison of the further value and a further range of potential values for the further timestamp.

Method operation 1103 may be performed after method operation 1102. At method operation 1103, the analysis module 410 re-analyzes the time series of values including the further value associated with the metric.

Method operation 1104 may be performed after method operation 1103. At method operation 1103, the pattern identifying module 420 identifies a further pattern associated with the time series based on the re-analyzing of the time series.

Method operation 1105 may be performed after method operation 1104. At method operation 1104, the range prediction module 430 determines a subsequent range of potential values for a subsequent timestamp in the time series of values. The determining of the subsequent range of potential values may be based on the further pattern associated with the time series.

Figure 12:
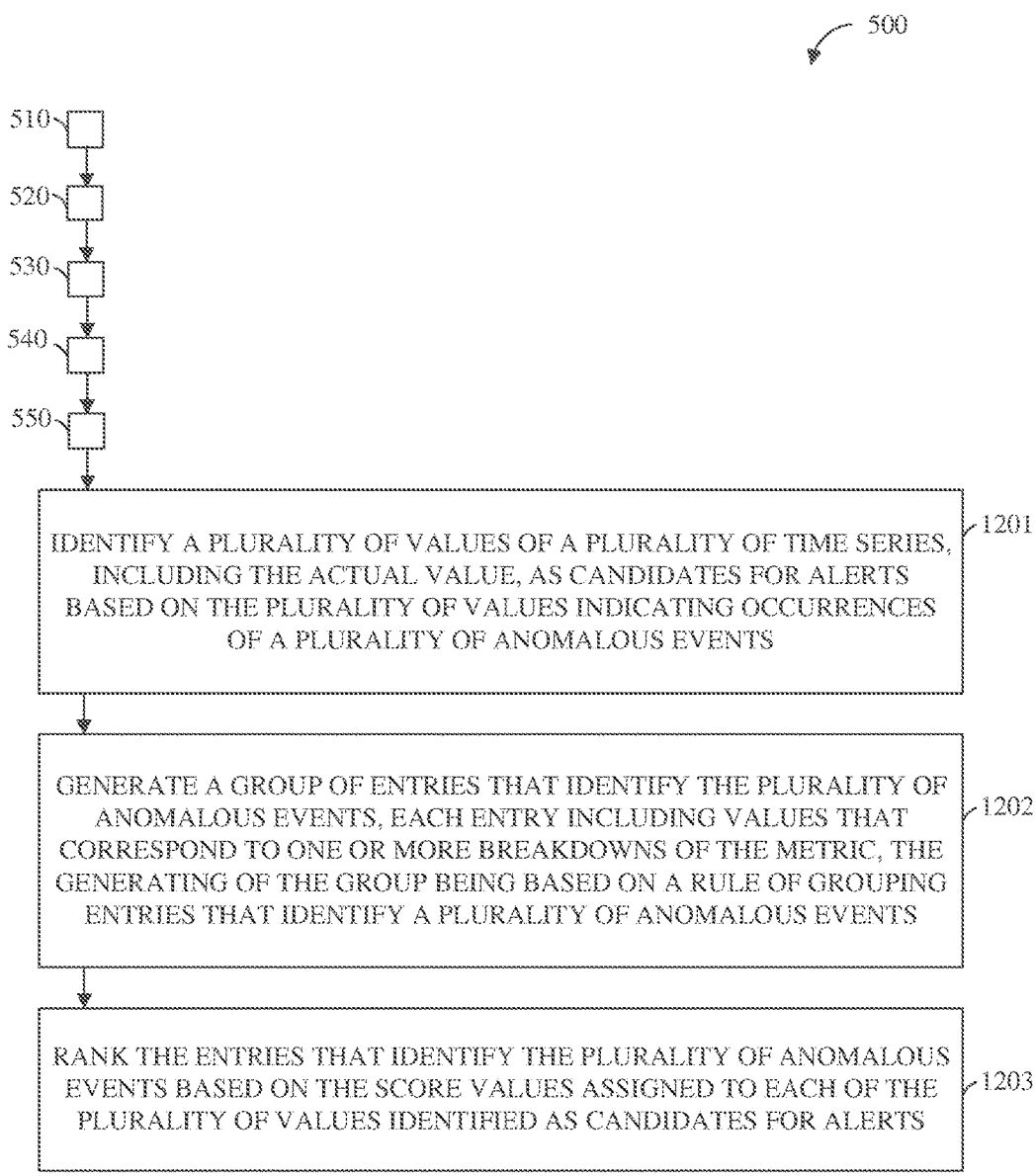
FIG. 12 is a flowchart that illustrates a method of detecting an anomalous event based on metrics pertaining to a production system and represents one or more additional steps of FIG. 5, according to some example embodiments.

As shown in FIG. 12, the method 500 may include one or more method operations 1201, 1202, and 1203, according to some example embodiments. Method operation 1201 may be performed after method operation 550, in which the anomaly detection module 450 identifies the actual value as a candidate for an alert based on the score value assigned to the actual value. At method operation 1201, the anomaly detection module 450 identifies a plurality of values of a plurality of time series, including the actual value, as candidates for alerts based on the plurality of values indicating occurrences of a plurality of anomalous events.

Method operation 1202 may be performed after method operation 1201. At method operation 1202, the grouping module 460 generates a group of entries that identify the plurality of anomalous events. Each entry may include values that correspond to one or more breakdowns of the metric. The generating of the group of entries may be based on a rule of grouping entries that identify a plurality of anomalous events. In some example embodiments, the rule of grouping entries that identify a plurality of anomalous events specifies grouping the entries based on timestamps corresponding to values identified as candidates for alerts. In certain example embodiments, the rule of grouping entries that identify a plurality of anomalous events specifies grouping the entries based on a breakdown associated with the metric.

Method operation 1203 may be performed after method operation 1202. At method operation 1203, the ranking module 470 ranks the entries that identify a plurality of anomalous events based on the score values assigned to each of the plurality of values identified as candidates for alerts.

In some example embodiments, the ranking module 470 ranks, for a period of time that includes the next timestamp, a plurality of time series based on score values assigned to a plurality of values included in respective time series of the plurality of time series. The time series may be one of the plurality of time series. The actual value may be one of the plurality of values.

Figure 13:
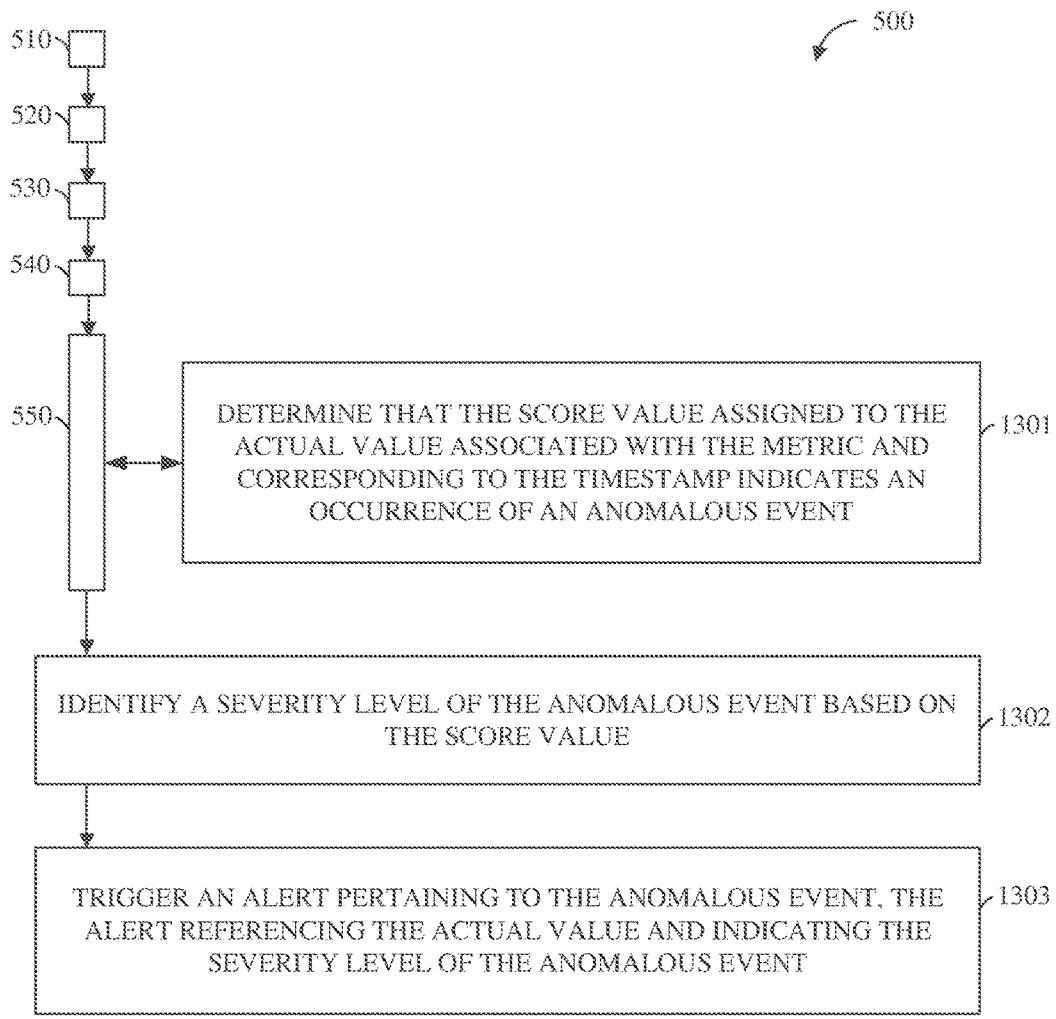
FIG. 13 is a flowchart that illustrates a method of detecting an anomalous event based on metrics pertaining to a production system and represents the step 550 of FIG. 5 in more detail and one or more additional steps of FIG. 5, according to some example embodiments.

FIG. 13 the method 500 may include one or more method operations 1301, 1302, and 1303, according to some example embodiments. Method operation 1301 may be performed as part (e.g., a precursor task, a subroutine, or a portion) of method operation 550, in which the anomaly detection module 450 identifies the actual value as a candidate for an alert based on the score value assigned to the actual value. At method operation 1301, the anomaly detection module 450 determines that the score value assigned to the actual value associated with the metric and corresponding to the timestamp indicates an occurrence of an anomalous event.

Method operation 1302 may be performed after method operation 550. At method operation 1302, the alerting module 480 identifies a severity level of the anomalous event based on the score value.

Method operation 1303 may be performed after method operation 1302. At method operation 1303, the alerting module 480 triggers an alert pertaining to the anomalous event. The alert may reference the actual value and may indicate the severity level of the anomalous event. The alerting module 480 may transmit a communication including the alert to a device associated with a user (e.g., an engineer).

FIG. 14 is a diagram 1400 that illustrates entries of anomalous events, according to some example embodiments. The triggering of one or more alerts may, in some instances, cause the display of entries of one or more anomalous events in a user interface (UI) of a device of a user. An alert may be represented by an entry that includes an identifier of a metric, a timestamp, and values of one or more breakdowns associated with the metric.

As shown in FIG. 14, item 1402 indicates two anomalous events represented by two different entries. Item 1401 indicates the same timestamp "5/14 14:40:40" for both entries identified by the item 1402. The two entries (e.g., alerts) identified by the item 1402 indicate the same metric type "Impression Rate," the same campaign type and OS type. However, the two entries indicate different channel IDs (e.g., "2" for Desktop and "2000" for Tablet). Based on these two entries presented in a UI on the device associated with a user, the user may determine that the two entries likely identify a problem with the Impression Rate metric affecting desktops and tablets but not mobile phones. By grouping similar entries (e.g., entries that have one or more elements with identical values) and presenting the grouped entries to the device of an engineer, the engineer may confine the scope of the engineer's investigation of the problem and more quickly identify the causes of the abnormality.

Items 1403 and 1404 illustrate a grouping of entries for the metric Ads_Return_Rate that indicate an abnormality of medium-high severity level. The abnormality affects the traffic associated with mobile phones but not tablets or desktops.

Example Mobile Device

Figure 15:
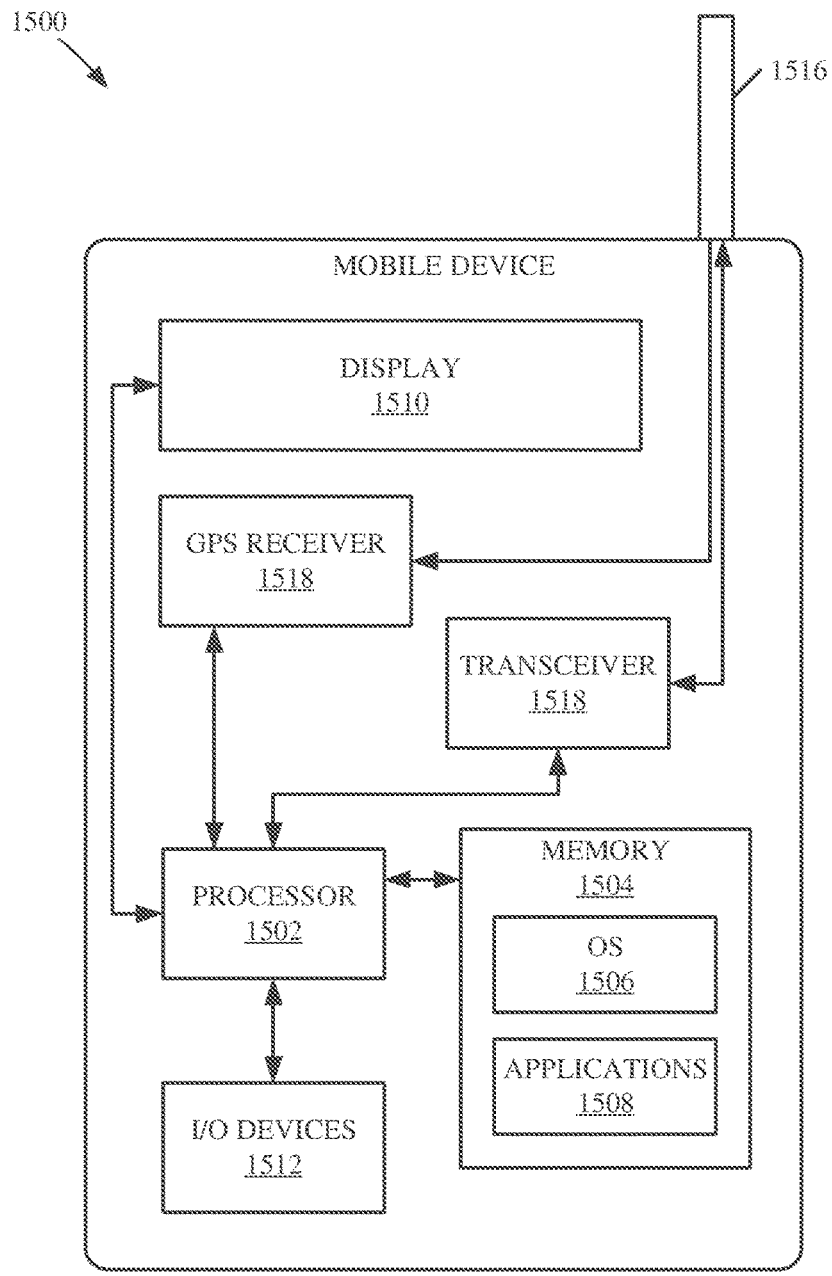
FIG. 15 is a block diagram illustrating a mobile device, according to some example embodiments.

FIG. 15 is a block diagram illustrating a mobile device 1500, according to an example embodiment. The mobile device 1500 may include a processor 1502. The processor 1502 may be any of a variety of different types of commercially available processors 1502 suitable for mobile devices 1500 (for example, an XScale architecture microprocessor, a microprocessor without interlocked pipeline stages (MIPS) architecture processor, or another type of processor 1502). A memory 1504, such as a random access memory (RAM), a flash memory, or other type of memory, is typically accessible to the processor 1502. The memory 1504 may be adapted to store an operating system (OS) 1506, as well as application programs 1508, such as a mobile location enabled application that may provide LBSs to a user. The processor 1502 may be coupled, either directly or via appropriate intermediary hardware, to a display 1510 and to one or more input/output (I/O) devices 1512, such as a keypad, a touch panel sensor, a microphone, and the like. Similarly, in some embodiments, the processor 1502 may be coupled to a transceiver 1514 that interfaces with an antenna 1516. The transceiver 1514 may be configured to both transmit and receive cellular network signals, wireless data signals, or other types of signals via the antenna 1516, depending on the nature of the mobile device 1500. Further, in some configurations, a GPS receiver 1518 may also make use of the antenna 1516 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 16:
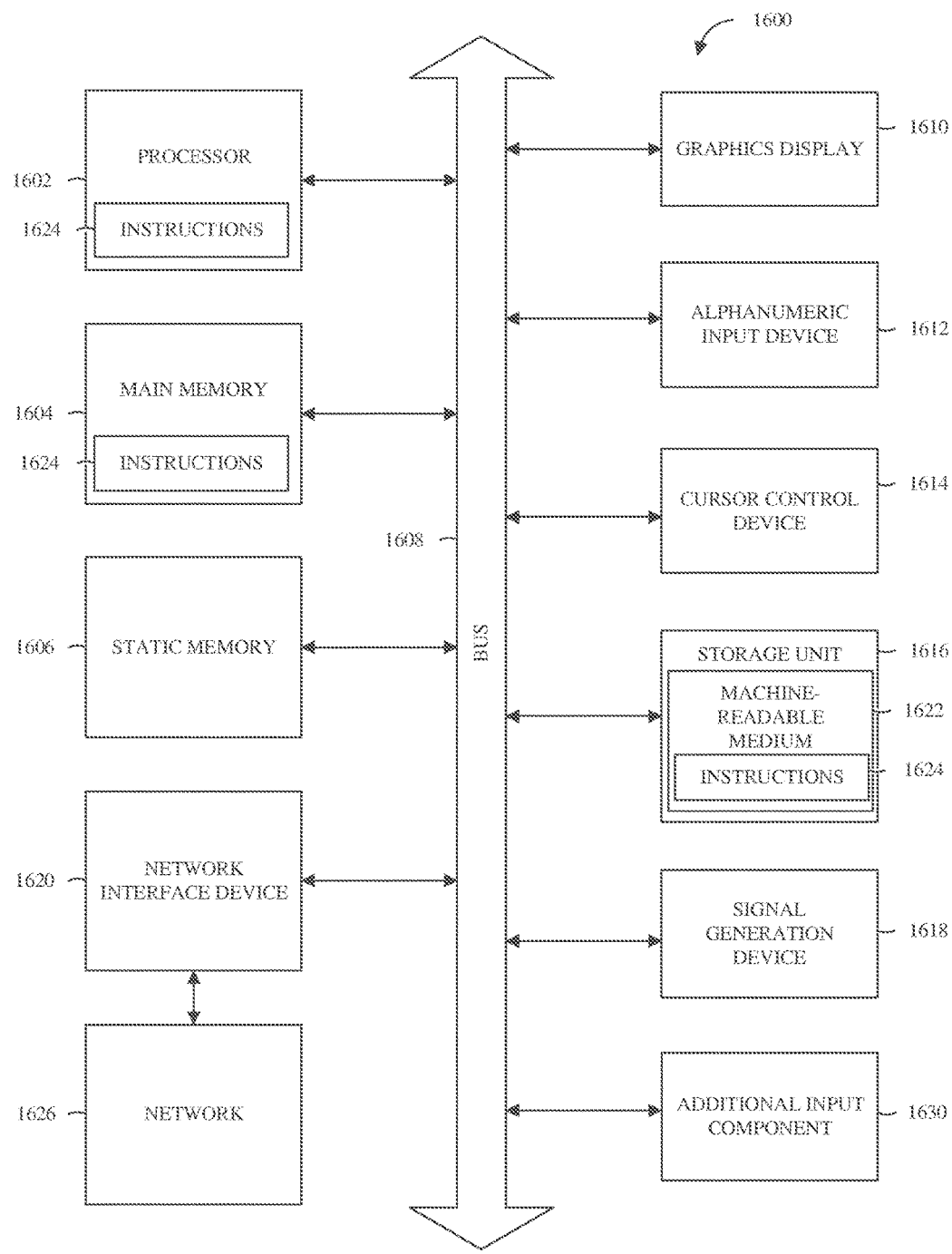
FIG. 16 is a block diagram illustrating components of a machine, according to some example embodiments, able to read instructions from a machine-readable medium and perform any one or more of the methodologies discussed herein.

FIG. 16 is a block diagram illustrating components of a machine 1600, according to some example embodiments, able to read instructions 1624 from a machine-readable medium 1622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 16 shows the machine 1600 in the example form of a computer system (e.g., a computer) within which the instructions 1624 (e.g., software, a program, an application, an applet, an app, or other executable code) for causing the machine 1600 to perform any one or more of the methodologies discussed herein may be executed, in whole or in part.

In alternative embodiments, the machine 1600 operates as a standalone device or may be connected (e.g., networked) to other machines. In a networked deployment, the machine 1600 may operate in the capacity of a server machine or a client machine in a server-client network environment, or as a peer machine in a distributed (e.g., peer-to-peer) network environment. The machine 1600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1624, sequentially or otherwise, that specify actions to be taken by that machine. Further, while only a single machine is illustrated, the term "machine" shall also be taken to include any collection of machines that individually or jointly execute the instructions 1624 to perform all or part of any one or more of the methodologies discussed herein.

The machine 1600 includes a processor 1602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1604, and a static memory 1606, which are configured to communicate with each other via a bus 1608. The processor 1602 may contain microcircuits that are configurable, temporarily or permanently, by some or all of the instructions 1624 such that the processor 1602 is configurable to perform any one or more of the methodologies described herein, in whole or in part. For example, a set of one or more microcircuits of the processor 1602 may be configurable to execute one or more modules (e.g., software modules) described herein.

The machine 1600 may further include a graphics display 1610 (e.g., a plasma display panel (PDP), a light emitting diode (LED) display, a liquid crystal display (LCD), a projector, a cathode ray tube (CRT), or any other display capable of displaying graphics or video). The machine 1600 may also include an alphanumeric input device 1612 (e.g., a keyboard or keypad), a cursor control device 1614 (e.g., a mouse, a touchpad, a trackball, a joystick, a motion sensor, an eye tracking device, or other pointing instrument), a storage unit 1616, an audio generation device 1618 (e.g., a sound card, an amplifier, a speaker, a headphone jack, or any suitable combination thereof), and a network interface device 1620.

The storage unit 1616 includes the machine-readable medium 1622 (e.g., a tangible and non-transitory machine-readable storage medium) on which are stored the instructions 1624 embodying any one or more of the methodologies or functions described herein. The instructions 1624 may also reside, completely or at least partially, within the main memory 1604, within the processor 1602 (e.g., within the processor's cache memory), or both, before or during execution thereof by the machine 1600. Accordingly, the main memory 1604 and the processor 1602 may be considered machine-readable media (e.g., tangible and non-transitory machine-readable media). The instructions 1624 may be transmitted or received over the network 1626 via the network interface device 1620. For example, the network interface device 1620 may communicate the instructions 1624 using any one or more transfer protocols (e.g., hypertext transfer protocol (HTTP)).

In some example embodiments, the machine 1600 may be a portable computing device, such as a smart phone or tablet computer, and have one or more additional input components 1630 (e.g., sensors or gauges). Examples of such input components 1630 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1624 for execution by the machine 1600, such that the instructions 1624, when executed by one or more processors of the machine 1600 (e.g., processor 1602), cause the machine 1600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:
   analyzing, by a machine including a memory and at least one hardware processor, a time series of values associated with a particular type of metric pertaining to a production system;
   identifying a pattern associated with the time series based on the analysis of the time series, the pattern describing an occurrence of particular values associated with the particular type of metric pertaining to the production system at particular timestamps of the time series;
   determining a range of potential values associated with the particular type of metric pertaining to the production system, the range of potential values corresponding to a next timestamp in the time series of values, the determining of the range of potential values being based on the pattern associated with the time series;
   assigning a score value to an actual value associated with the particular type of metric and corresponding to the next timestamp in the time series, the assigning of the score value being based on a comparison of the actual value and the range of potential values;
   identifying the actual value as a candidate for an alert based on the score value assigned to the actual value;
   accessing a further value associated with the particular type of metric and corresponding to a further timestamp in the time series;
   determining that the further value is not a candidate for an alert based on a further score value assigned to the further value as a result of a comparison of the further value and a further range of potential values for the further timestamp;
   re-analyzing the time series of values including the further value associated with the particular type of metric; and
   identifying a further pattern associated with the time series based on the re-analyzing of the time series.

2. The method of claim 1, further comprising:
   generating the time series including a plurality of values of the particular type of metric, the plurality of values of the particular type of metric being identified based on log data received from the production system.

3. The method of claim 1, further comprising:
   generating the time series including a plurality of values of a breakdown associated with the particular type of metric, the plurality of values of the breakdown being identified based on log data received from the production system.

4. The method of claim 1, wherein the analyzing of the time series includes:
   identifying the values in the time series as training data for identifying the pattern associated with the time series of values;
   identifying an outlier value in the time series of values based on the analysis of the time series; and
   excluding the outlier value from the training data,
   wherein the identifying of the pattern associated with the time series is based on the training data excluding the outlier value.

5. The method of claim 4, wherein the outlier value corresponds to a previous candidate for an alert.

6. The method of claim 1, wherein the determining of the range of potential values for the next timestamp in the time series includes:
   detecting one or more periods of time in the time series that exhibit the pattern associated with the time series; and
   identifying a plurality of values of the time series that correspond to a particular time point in the pattern based on analyzing the one or more periods of time in the time series that exhibit the pattern.

7. The method of claim 1, wherein the assigning of the score value includes:
   determining that the actual value associated with the particular type of metric falls outside the range of potential values;
   determining a deviation level of the actual value from the range of potential values; and
   computing the score value based on the deviation level.

8. The method of claim 1, further comprising:
   determining a subsequent range of potential values for a subsequent timestamp in the time series of values based on the further pattern associated with the time series.

9. The method of claim 1, further comprising:
   identifying a plurality of values of a plurality of time series, including the actual value, as candidates for alerts based on the plurality of values indicating occurrences of a plurality of anomalous events; and
generating a group of entries that identify the plurality of anomalous events, each entry including values that correspond to one or more breakdowns of the particular type of metric, the generating of the group being based on a rule of grouping entries that identify a plurality of anomalous events.

10. The method of claim 9, further comprising:
ranking the entries that identify a plurality of anomalous events based on the score values assigned to each of the plurality of values identified as candidates for alerts.

11. The method of claim 9, wherein the rule of grouping entries that identify a plurality of anomalous events specifies grouping the entries based on timestamps corresponding to values identified as candidates for alerts.

12. The method of claim 9, wherein the rule of grouping entries that identify a plurality of anomalous events specifies grouping the entries based on a breakdown associated with the particular type of metric.

13. The method of claim further comprising:
for a period of time that includes the next timestamp, ranking a plurality of time series based on score values assigned to a plurality of values included in respective time series of the plurality of time series that correspond to a plurality of timestamps in the period of time, the time series being one of the plurality of time series and the actual value being one of the plurality of values.

14. The method of claim 1, wherein the identifying of the actual value as the candidate for the alert includes determining that the score value assigned to the actual value associated with the particular type of metric and corresponding to the timestamp indicates an occurrence of an anomalous event; and further comprising:
identifying a severity level of the anomalous event based on the score value; and
triggering an alert pertaining to the anomalous event, the alert referencing the actual value and indicating the severity level of the anomalous event.

15. A system, comprising:
one or more hardware processors; and
a machine-readable medium for storing instructions that, when executed by the one or more hardware processors, cause the one or more hardware processors to perform operations comprising:
analyzing a time series of values associated with a particular type of metric pertaining to a production system;
identifying a pattern associated with the time series based on the analysis of the time series, the pattern describing an occurrence of particular values associated with the particular type of metric pertaining to the production system at particular timestamps of the time series;
determining a range of potential values associated with the metric pertaining to the production system, the range of potential values corresponding to a next timestamp in the time series of values, the determining of the range of potential values being based on the pattern associated with the time series;
assigning a score value to an actual value associated with the particular type of metric and corresponding to the next timestamp in the time series, the assigning of the score value being based on a comparison of the actual value and the range of potential values;
identifying the actual value as a candidate for an alert based on the score value assigned to the actual value;
accessing a further value associated with the particular type of metric and corresponding to a further timestamp in the time series;
determining that the further value is not a candidate for an alert based on a further score value assigned to the further value as a result of a comparison of the further value and a further range of potential values for the further timestamp;
re-analyzing the time series of values including the further value associated with the particular type of metric; and
identifying a further pattern associated with the time series based on the re-analyzing of the time series.

16. The system of claim 15, wherein the operations further comprise:
for a period of time that includes the next timestamp, ranking a plurality of time series based on score values assigned to a plurality of values included in respective time series of the plurality of time series that correspond to a plurality of timestamps in the period of time, the time series being one of the plurality of time series and the actual value being one of the plurality of values.

17. The system of claim 15, wherein the operations further comprise:
triggering an alert pertaining to an anomalous event identified based on the score value assigned to the actual value associated with the particular type of metric and corresponding to the timestamp, the alert referencing the actual value and indicating a severity level of the anomalous event.

18. A non-transitory machine-readable medium comprising instructions that, when executed by one or more hardware processors of a machine, cause the one or more hardware processors to perform operations comprising:
analyzing a time series of values associated with a particular type of metric pertaining to a production system;
identifying a pattern associated with the time series based on the analysis of the time series, the pattern describing an occurrence of particular values associated with the particular type of metric pertaining to the production system at particular timestamps of the time series;
determining a range of potential values associated with the particular type of metric pertaining to the production system, the range of potential values corresponding to a next timestamp in the time series of values, the determining of the range of potential values being based on the pattern associated with the time series;
assigning a score value to an actual value associated with the particular type of metric and corresponding to the next timestamp in the time series, the assigning of the score value being based on a comparison of the actual value and the range of potential values;
identifying the actual value as a candidate for an alert based on the score value assigned to the actual value;
accessing a further value associated with the particular type of metric and corresponding to a further timestamp in the time series;
determining that the further value is not a candidate for an alert based on a further score value assigned to the further value as a result of a comparison of the further value and a further range of potential values for the further timestamp;
re-analyzing the time series of values including the further value associated with the particular type of metric; and
identifying a further pattern associated with the time series based on the re-analyzing of the time series.

* * * * *

UNITED STATES PATENT AND TRADEMARK OFFICE
CERTIFICATE OF CORRECTION

PATENT NO. : 9,848,007 B2
APPLICATION NO. : 14/501664
DATED : December 19, 2017
INVENTOR(S) : Chen et al.

Page 1 of 1

It is certified that error appears in the above-identified patent and that said Letters Patent is hereby corrected as shown below:

In the Claims

In Column 23, Line 22, in Claim 13, delete "claim" and insert --claim 1,-- therefor Signed and Sealed this
Twentieth Day of August, 2019

Andrei Iancu
*Director of the United States Patent and Trademark Office*